(12) United States Patent
Zhang et al.

(10) Patent No.: US 12,401,875 B2
(45) Date of Patent: Aug. 26, 2025

(54) TAB DETECTION MECHANISM AND TAB DETECTION DEVICE

(71) Applicant: CONTEMPORARY AMPEREX TECHNOLOGY (HONG KONG) LIMITED, Hong Kong (CN)

(72) Inventors: Zhipeng Zhang, Fujian (CN); Yuyang Mao, Fujian (CN); Ping Jiang, Fujian (CN); Yong Chen, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 118 days.

(21) Appl. No.: 18/383,928

(22) Filed: Oct. 26, 2023

(65) Prior Publication Data

US 2024/0171840 A1    May 23, 2024

Related U.S. Application Data

(63) Continuation of application No. PCT/CN2023/084767, filed on Mar. 29, 2023.

(30) Foreign Application Priority Data

Nov. 22, 2022 (CN) .......................... 202223105124.5

(51) Int. Cl.
  *H04N 23/55* (2023.01)
  *G02B 26/08* (2006.01)
  (Continued)

(52) U.S. Cl.
  CPC ......... *H04N 23/55* (2023.01); *G02B 26/0883* (2013.01); *G03B 17/561* (2013.01); *G06V 20/60* (2022.01); *H01M 10/0404* (2013.01)

(58) Field of Classification Search
  CPC .. H04N 23/55; G02B 26/0883; G03B 17/561; G06V 20/60; G06V 2201/06;
  (Continued)

(56) References Cited

U.S. PATENT DOCUMENTS

| | | | | |
|---|---|---|---|---|
| 5,405,015 A | * | 4/1995 | Bhatia | G01N 21/9009 |
| | | | | 209/939 |
| 5,714,998 A | * | 2/1998 | Wheeler | H04N 7/188 |
| | | | | 356/237.1 |

(Continued)

FOREIGN PATENT DOCUMENTS

| | | |
|---|---|---|
| CN | 114018931 A | 2/2022 |
| CN | 114354598 A | 4/2022 |

(Continued)

OTHER PUBLICATIONS

Extended European Search Report issued Jul. 26, 2024 in European Patent Application No. 23741964.3.

(Continued)

*Primary Examiner* — Timothy R Newlin
(74) *Attorney, Agent, or Firm* — XSENSUS LLP

(57) ABSTRACT

This application discloses a tab detection mechanism and a tab detection device. The tab detection mechanism may be configured to detect a tab portion on an electrode core. The tab detection mechanism may include a visual camera; a prism disposed below the visual camera and configured to reflect light on a side surface of the tab portion to the visual camera; and a first driver, connected to the visual camera and configured to drive the visual camera to move in a vertical direction. The visual camera is capable of shooting a plurality of images while moving.

13 Claims, 8 Drawing Sheets

(51) Int. Cl.
*G03B 17/56* (2021.01)
*G06V 20/60* (2022.01)
*H01M 10/04* (2006.01)

(58) Field of Classification Search
CPC ... G06V 10/14; H01M 10/0404; G01B 11/30; G01N 21/01; G01N 21/89; Y02E 60/10
See application file for complete search history.

(56) References Cited

U.S. PATENT DOCUMENTS

| | | | | |
|---|---|---|---|---|
| 6,448,549 | B1* | 9/2002 | Safaee-Rad | G01N 21/9054 250/223 B |
| 8,988,523 | B1* | 3/2015 | Kim | G06V 10/147 348/340 |
| 11,657,494 | B1* | 5/2023 | Zhao | G06V 10/60 348/106 |
| 2011/0290276 | A1* | 12/2011 | Cha | B23K 26/352 134/1 |
| 2013/0176435 | A1* | 7/2013 | Haas | B61K 9/08 348/148 |
| 2014/0054463 | A1* | 2/2014 | Koga | H01L 22/12 156/379 |
| 2021/0296679 | A1* | 9/2021 | Chung | H01M 10/0404 |
| 2022/0126399 | A1* | 4/2022 | An | H01M 50/536 |
| 2022/0264019 | A1* | 8/2022 | Kobayashi | H05K 13/0815 |
| 2023/0236259 | A1* | 7/2023 | Chae | G01R 31/367 324/426 |
| 2023/0289948 | A1* | 9/2023 | Chen | G06T 7/70 |
| 2023/0395915 | A1* | 12/2023 | Ahn | H01M 50/512 |
| 2023/0406619 | A1* | 12/2023 | Lee | B65D 25/10 |
| 2024/0102966 | A1* | 3/2024 | Chen | G01N 29/069 |
| 2024/0144629 | A1* | 5/2024 | Feijen | B25J 15/0038 |
| 2024/0345000 | A1* | 10/2024 | Kim | G01N 21/952 |

FOREIGN PATENT DOCUMENTS

| | | |
|---|---|---|
| CN | 114354611 A | 4/2022 |
| CN | 114609153 A | 6/2022 |
| CN | 114894810 A | 8/2022 |
| KR | 10-1015988 B1 | 2/2011 |
| WO | 2022/099583 A1 | 5/2022 |

OTHER PUBLICATIONS

International Search Report mailed on Aug. 2, 2023, received for PCT Application PCT/CN2023/084767, filed on Mar. 29, 2023, 10 pages including English Translation.

Communication pursuant to Article 94(3) EPC issued Jan. 22, 2025 in European Patent Application No. 23741964.3.

* cited by examiner

TAB DETECTION MECHANISM AND TAB DETECTION DEVICE

CROSS-REFERENCE TO RELATED APPLICATIONS

This application is a continuation of International Application No. PCT/CN2023/084767, filed Mar. 29, 2023, which claims priority to Chinese Patent Application No. 202223105124.5, filed with the China National Intellectual Property Administration on Nov. 22, 2022 and entitled "TAB DETECTION MECHANISM AND TAB DETECTION DEVICE", each of which is incorporated herein by reference in its entirety.

TECHNICAL FIELD

This application relates to the field of battery production, and in particular, to a tab detection mechanism and a tab detection device.

BACKGROUND

Energy conservation and emission reduction are crucial to the sustainable development of automobiles. Electric vehicles have drawn wide attention due to their advantage of environment friendliness. Traction battery is an important part of electric vehicles.

An electrode core of a traction battery is provided with a tab portion. During production of the traction battery, it is usually necessary to detect the tab portion so as to identify the state of the tab portion. In some cases, the tab portion is mainly detected by means of artificial vision. This results in low detection efficiency and easily leads to false detection, affecting the quality of batteries.

SUMMARY

In view of this, embodiments of this application provide a tab detection mechanism and a tab detection device, capable of detecting a state of a tab portion automatically, thereby solving the problems about low detection efficiency and probable false detection.

An embodiment of a first aspect of this application provides a tab detection mechanism, configured to detect a tab portion on an electrode core, including:
  a visual camera;
  a prism, disposed below the visual camera and configured to reflect light on a side surface of the tab portion to the visual camera; and
  a first drive member or driver, connected to the visual camera and configured to drive the visual camera to move in a vertical direction, wherein the visual camera is capable of shooting a plurality of images while moving.

The tab detection mechanism provided by the embodiment of this application includes the visual camera, the prism and the first drive member, the prism can reflect the light on the side surface of the tab portion to the visual camera, and the first drive member can drive the visual camera to move in the vertical direction. Therefore, the above tab detection mechanism can automatically shoot an image of the side surface of the tab portion, so that the state of the tab portion is detected and whether the tab portion is abnormal or not is analyzed based on the image, solving the problems about low detection efficiency and probable false detection caused in manual detection, thereby improving the detection efficiency and accuracy. In addition, if a space on two sides of the tab portion is insufficient, the visual camera cannot be placed horizontally. According to the embodiment of this application, a view field direction of the visual camera is changed by virtue of the prism, and the visual camera can be placed vertically or obliquely on an outer side of the tab portion, thereby solving the problem that the visual camera is inconvenient to arrange. Moreover, the first drive member can drive the visual camera to implement fly-shot imaging, so that the visual camera can acquire a complete image of the side surface of the tab portion during one-time image acquisition, further improving the detection efficiency and guaranteeing a detection effect.

In some embodiments, the visual camera includes a first bracket connected to the first drive member, as well as a camera and a telecentric lens that are disposed on the first bracket, and the telecentric lens and the camera are sequentially disposed above the prism in the vertical direction.

With use of the foregoing technical solution, the prism can change the view field direction of the visual camera. Therefore, the camera and the telecentric lens can both be placed vertically, solving the problem that the camera is inconvenient to place due to a too small space on sides of the tab portion. The first drive member can drive the camera and the telecentric lens to move in the vertical direction simultaneously, thereby realizing fly-shot imaging of the camera.

In some embodiments, an included angle between the prism and the vertical direction is 45°.

With use of the 45° prism, the view field direction of the camera can be changed by virtue of the prism, the prism can reflect light on the side surface of the tab portion, and the camera acquires an image of the side surface of the tab portion by shooting a surface of the prism.

In some embodiments, a mounting height of the telecentric lens from the prism is greater than or equal to a difference between a working distance of the telecentric lens and a horizontal distance from an upper edge of the prism to the tab portion.

With the above condition satisfied, the prism can be installed on one side of the tab portion, and the mounting height of the telecentric lens depends on the working distance of the telecentric lens and the horizontal distance from the upper edge of the prism to the tab portion. In this way, it can be ensured that the side surface of the tab portion is within the working distance of the telecentric lens, and thus the visual camera can shoot a complete and clear image of the side surface of the tab portion. The above tab detection mechanism can detect a single laver of tabs or a plurality of lavers of tabs and can detect situations such as unevenness of the plurality of layers of tabs and staggering of the tabs.

In some embodiments, the tab portion includes a plurality of tabs stacked in a first direction, a moving distance of the visual camera in the vertical direction is greater than a maximum offset distance of the plurality of tabs in a second direction, and the second direction is perpendicular to the first direction.

With the above condition satisfied, the visual camera moves a certain distance in the vertical direction, so that it can be ensured that the visual camera can shoot side surfaces of the plurality of tabs and shoot staggered positions of the tabs, thereby improving the detection accuracy.

In some embodiments, a maximum height difference between the upper edge of the prism and a lower edge of the prism is greater than a view field of the visual camera, and the view field of the visual camera is greater than a total thickness of the tab portion.

With the above condition satisfied, the prism can be ensured to reflect the entire side surface of the tab portion and the visual camera can be ensured to shoot the entire side surface of the tab portion.

In some embodiments, the tab detection mechanism further includes a second drive member or driver, and the second drive member is connected to the prism and configured to drive the prism to move in a direction close to or away from the electrode core.

With the second drive member provided, the prism is enabled to move in the direction close to or away from the electrode core so as to keep away from the electrode core that is being conveyed.

In some embodiments, the second drive member is a cylinder, and the second drive member is configured to drive the prism to move in the vertical direction.

With use of the foregoing technical solution, the prism moves in only the vertical direction and can be placed at a side portion of the tab portion after moving to a proper position, thereby ensuring that the prism can reflect light on the side surface of the tab portion.

An embodiment of a second aspect of this application provides a tab detection device, configured to detect a first tab portion and a second tab portion on an electrode core, including:
 a first tab detection mechanism or detector, configured to detect an inner side surface of the first tab portion;
 a second tab detection mechanism or detector, configured to detect an outer side surface of the second tab portion;
 a third tab detection mechanism or detector, configured to detect an outer side surface of the first tab portion; and
 a fourth tab detection mechanism or detector, configured to detect an inner side surface of the second tab portion, wherein
at least one of the first tab detection mechanism, the second tab detection mechanism, the third tab detection mechanism and the fourth tab detection mechanism is the tab detection mechanism according to the first aspect.

The tab detection device includes the first tab detection mechanism, the second tab detection mechanism, the third tab detection mechanism and the fourth tab detection mechanism that are capable of detecting the inner side surface of the first tab portion, the outer side surface of the first tab portion, the inner side surface of the second tab portion and the outer side surface of the second tab portion, respectively. The above tab detection device can implement automatic and comprehensive detection of tab portions without manual operation, thereby improving the detection efficiency and accuracy and improving the quality of batteries.

In some embodiments, a prism in the second tab detection mechanism and a prism in the third tab detection mechanism are located on a same second bracket and are arranged opposite to each other. A prism in the first tab detection mechanism and a prism in the fourth tab detection mechanism are arranged in a mirror-image form.

In this way, the second tab detection mechanism and the third tab detection mechanism can implement synchronous detection, further improving the detection efficiency.

In some embodiments, the tab detection device further includes a light shield plate and a third drive member or driver, the third drive member is configured to drive the light shield plate to move, so that the light shield plate is located between the prism of the second tab detection mechanism and the prism of the third tab detection mechanism, and the light shield plate is a non-transparent plate.

With use of the foregoing technical solution, the light shield plate can prevent mutual interference between the second detection mechanism and the third detection mechanism, and the light shield plate is movable so as not to hinder conveying of the electrode core.

In some embodiments, the light shield plate is a non-transparent plate subjected to matte black processing.

With use of the foregoing technical solution, the light shield plate is subjected to matte black processing, therefore the light shield plate can not only shield light but also avoid light reflection, thereby preventing reflected light from affecting an imaging effect of the visual camera.

In some embodiments, the tab detection device further includes a conveying mechanism or conveyer, and the conveying mechanism is configured to convey the electrode core, so that the electrode core sequentially passes through the first tab detection mechanism, the second tab detection mechanism, the third tab detection mechanism and the fourth tab detection mechanism.

With use of the foregoing technical solution, the conveying mechanism can drive an electrode core positioning table and the electrode core to move, so that the electrode core sequentially passes through the four tab detection mechanisms for detecting the inner and outer side surfaces of the first tab portion and the second tab portion. In this way, wrinkling, folding, cracking and the like of the tabs, as well as staggering situation and evenness of a plurality of layers of tabs are detected.

The foregoing description is merely an overview of the technical solution of this application. For a better understanding of the technical means in this application, they can be implemented according to the content of the specification, and to make the above and other objectives, features and advantages of this application more obvious and easier to understand, the following describes specific implementations of this application.

BRIEF DESCRIPTION OF DRAWINGS

To describe the technical solutions in the embodiments of this application more clearly-, the following briefly describes the accompanying drawings required for describing the embodiments or conventional technologies. Apparently, the accompanying drawings in the following description show merely some of the embodiments of this application, and persons of ordinary skill in the art may still derive other drawings from these accompanying drawings without creative efforts.

Figure 1:
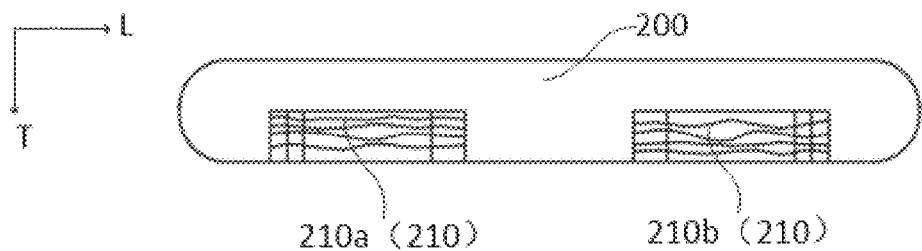
FIG. 1 is a front view of an electrode core according to an embodiment of this application.

The reference numerals in the drawings refer to:

100. tab detection mechanism; 10. visual camera; 11. first bracket; 111. fixing plate; 112. camera stand; 113. lens holder; 12. camera; 13. telecentric lens; 20. prism assembly; 21. prism; 22. second bracket; 23. second drive member; 30. first drive member, 40. light shield plate, 50. third drive member, 100*a*. first tab detection mechanism; 100*b*, second tab detection mechanism; 100*c*. third tab detection mechanism; 100*d*. fourth tab detection mechanism; 200. electrode core; 210. tab portion; 210*a*. first tab portion; 210*b*. second tab portion; 300. conveying mechanism; 310. electrode core positioning table; and 1000. tab detection device.

DETAILED DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitation on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and any other variations thereof in the specification, claims and brief description of drawings of this application are intended to cover non-exclusive inclusions.

In the description of the embodiments of this application, the terms "first", "second" and the like are merely intended to distinguish different objects, and shall not be understood as any indication or implication of relative importance or any implicit indication of the number, particular sequence or primary-secondary relationship of the technical features indicated. In the description of the embodiments of this application, "a plurality of" means more than two unless otherwise specifically stated.

Herein, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by those skilled in the art that the embodiments described herein may be combined with other embodiments.

In the description of the embodiments of this application, the term "and/or" is merely for describing an associative relationship of associated objects, indicating that three relationships may be present. For example, A and/or B may indicate the following three cases: presence of only A, presence of both A and B, and presence of only B. In addition, the character "I" herein generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length". "width". "thickness", "upper", "lower", "front", "rear", "vertical", "horizontal", "top". "bottom", "inside", "outside", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as limitations on the embodiments of this application.

In the description of the embodiments of this application, unless otherwise specified and defined explicitly, the terms "mount". "connect". "join", and "fix" should be understood in their general senses. For example, they may refer to a fixed connection, a detachable connection, or an integral connection, may refer to a mechanical connection or an electrical connection, and may refer to a direct connection, an indirect connection via an intermediate medium, internal communication between two elements, or an interaction relationship of two elements. Persons of ordinary skill in the art can understand specific meanings of these terms in this application as appropriate to specific situations.

Currently, energy conservation and emission reduction are crucial to the sustainable development of automobiles. Electric vehicles have drawn wide attention due to their advantage of environment friendliness. Traction battery is an important part of electric vehicles.

Traction battery may include, but is not limited to, three forms: battery cell, battery module and battery pack. Battery cell is the smallest unit of a traction battery and typically includes a housing, a cover plate, an electrode core, an electrolyte capsule, and other functional components. In application, a plurality of battery cells can be connected by using an electric connecting structure and a fixing structure, and then are assembled with a thermal management system to form a battery, and the battery can be directly assembled on an electric apparatus to provide electrical energy for the electric apparatus. Alternatively, a plurality of battery cells are first assembled into battery modules by using an electric connecting structure, a fixing structure and the like, and then a plurality of battery modules, fitting with a thermal management system, are assembled on an electric apparatus to provide electrical energy for the electrical energy. Still alternatively, a plurality of battery modules, fitting with a thermal management system, are assembled into a box to form a battery pack, and then the battery pack is directly assembled on an electric apparatus to provide electrical energy for the electric apparatus.

An electrode core of a battery cell is provided with tab portions. The tab portions are metal conductors for leading positive and negative electrodes out of the electrode core. Two tab portions extend out of one electrode core. The tab portions serve as contact points during charge and discharge of the battery. In addition, each tab portion typically includes a plurality of layers of tabs, to be specific, the tab portion includes a plurality of stacked tabs.

During production of a traction battery, it is usually necessary to detect the tab portion so as to identify the state of the tab portion. In some cases, the tab portion is mainly detected by means of artificial vision. This results in low detection efficiency and easily leads to false detection, affecting the quality of batteries.

To solve the problems, the applicants have designed a tab detection mechanism and a tab detection device through in-depth research. The tab detection mechanism includes a visual camera, a prism and a first drive member. The prism can reflect light on a side surface of a tab portion to the visual camera, so that the visual camera can acquire an image of the side surface of the tab portion. In addition, the first drive member can drive the visual camera to move in a vertical direction, and the visual camera can shoot a plurality of images while moving. Therefore, the above tab detection mechanism can acquire a complete image of the side surface of the tab portion with a one-time image acquisition process, thereby implementing automatic visual detection for the tab portion, solving the problems about low detection efficiency and probable false detection for the tab portion, and guaranteeing the quality of batteries.

An embodiment of a first aspect of this application provides a tab detection mechanism configured to detect a tab portion on an electrode core.

Figure 2:
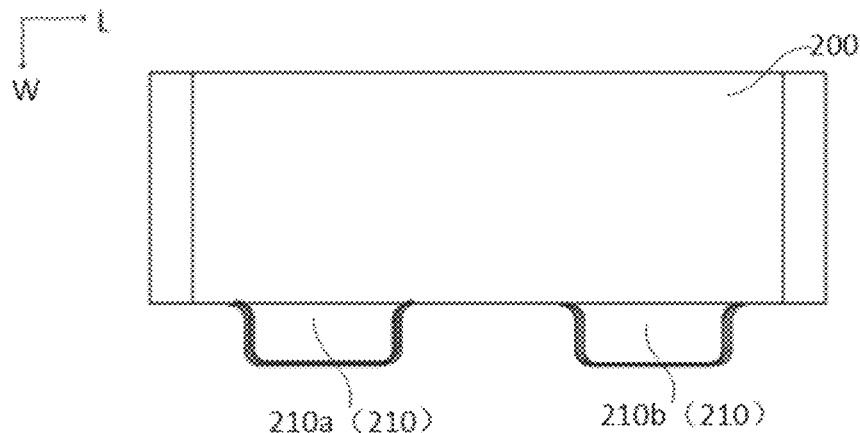
FIG. 2 is a top view of an electrode core according to an embodiment of this application.

FIG. 1 is a front view of an electrode core 200 in an embodiment, and FIG. 2 is a top view of an electrode core 200 in an embodiment. Referring to FIG. 1 and FIG. 2, the electrode core 200 is provided with two tab portions 210, where each tab portion 210 includes a plurality of tabs stacked in a first direction, and the first direction is a thickness direction T of the electrode core 200. In the electrode core 200 shown in FIG. 1, the plurality of tabs in each tab portion 210 are uneven. In the electrode core 200 shown in FIG. 2, the plurality of tabs in each tab portion 210 are staggered, that is, the plurality of tabs are staggered in a second direction perpendicular to the first direction, and the second direction is a length direction L of the electrode core 200.

The two tab portions 210 are a first tab portion 210a and a second tab portion 210b, respectively, where the first tab portion 210a is an anode tab, and the second tab portion 210b is a cathode tab.

The tab detection mechanism provided in this application can be used to detect the situation of the plurality of layers of tabs, but is not limited thereto. The tab detection mechanism may also be used to detect the situation of a single layer of tabs.

Figure 3:
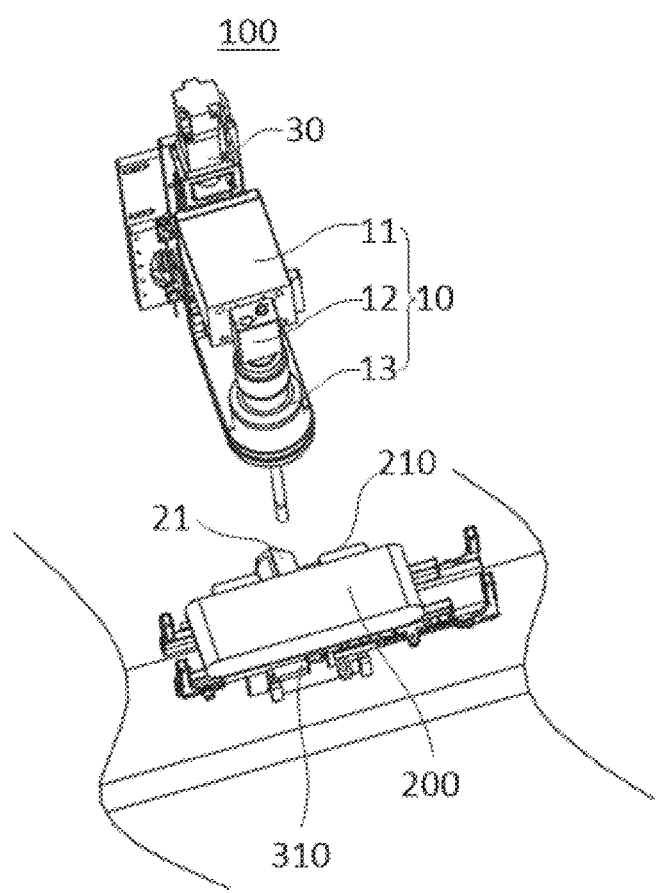
FIG. 3 is a three-dimensional schematic diagram of a tab detection mechanism according to an embodiment of this application.

Referring to FIG. 3, the tab detection mechanism 100 includes a visual camera 10, a prism 21 and a first drive member 30. The prism 21 is disposed below the visual camera 10 and configured to reflect light on a side surface of the tab portion 210 to the visual camera 10; the first drive member 30 is connected to the visual camera 10 and configured to drive the visual camera 10 to move in a vertical direction; and the visual camera 10 is capable of shooting a plurality of images while moving.

The visual camera 10 can acquire an image projected to a sensor through a lens. The visual cameras 10 can be classified into CCD cameras and CMOS cameras according to the types of chips, and can be classified into line-array cameras and area-array cameras according to structural characteristics of the sensors. The type of the visual camera 10 is not limited in this application.

The prism 21 includes a reflective surface, and the reflective surface of the prism 21 is toward the side surface of the tab portion 210 so as to reflect light on the side surface of the tab portion 210. The reflective surface of the prism 21 may also be disposed toward the visual camera 10, and the visual camera 10 can shoot the reflective surface of the prism 21, so as to acquire an image of the side surface of the tab portion 210.

In particular, the "side surface" of the tab portion 210 may be an inner side surface or an outer side surface of the tab portion 210, where the "inner side surface" refers to a side surface of a side of one tab portion 210 close to another tab portion 210, and the "outer side surface" refers to a side surface of a side of one tab portion 210 facing away from another tab portion 210.

Optionally, the visual camera 10 is disposed in the vertical direction, and the prism 21 is inclined with respect to the vertical direction, so that the prism 21 can be toward both the side surface of the tab portion 210 and the visual camera 10, thereby helping to reflect the light on the side surface of the tab portion 210 to the visual camera 10. It can be understood that the visual camera 10 may also be disposed in a manner of forming a specified included angle with respect to the vertical direction as long as the prism 21 can reflect the light on the side surface of the tab portion 210 to the visual camera 10.

The first drive member 30 is configured to drive the visual camera 10 to move in the vertical direction. The visual camera 10 implements fly-shot imaging while moving, such that the visual camera 10 can continuously acquire a plurality of images of the tab portion 210, thereby helping to acquire a complete image of the tab portion 210. The first drive member 30 may be, but is not limited to, a motor ball screw module. The first drive member 30 may also be a cylinder or another drive member.

Detection principle of the tab detection mechanism 100 is as follows: The electrode core 200 is fixed to an electrode core positioning table 310; the prism 21 is disposed on one side of the electrode core positioning table 310; the visual camera 10 is disposed above the prism 21; the prism 21 projects the image of the side surface of the tab portion 210 onto the visual camera 10; the first drive member 30 drives the visual camera 10 to move in the vertical direction; and the visual camera 10 continuously shoots a plurality of images while moving so as to acquire a complete image of the side surface of the tab portion 210, so that the state of the tab portion 210 can be detected and whether the tab portion 210 is abnormal or not is determined based on the image.

The tab portion 210 includes one or a plurality of tabs. In a case that the tab portion 210 includes one tab, the visual camera 10 can acquire an image of the side surface of the tab for detecting whether the tab is in abnormal situations such as wrinkling, folding and cracking. In a case that the tab portion 210 includes a plurality of stacked tabs, the visual camera 10 can acquire images of the plurality of tabs for detecting whether the number of the tabs is correct or not, whether the tabs are folded or not, whether the evenness of the plurality of layers of tabs is qualified or not, whether staggered distances of the plurality of layers of tabs are qualified or not, and the like.

The tab detection mechanism 100 provided by this embodiment of this application includes the visual camera 10, the prism 21 and the first drive member 30, where the prism 21 can reflect the light on the side surface of the tab portion 210 to the visual camera 10, and the first drive member 30 can drive the visual camera 10 to move in the vertical direction. Therefore, the tab detection mechanism 100 can automatically shoot an image of the side surface of the tab portion 210, so that the state of the tab portion 210 is detected and whether the tab portion 210 is abnormal or not is analyzed based on the image, solving the problems about low detection efficiency and probable false detection caused in manual detection, thereby improving the detection efficiency and accuracy.

In addition, if a space on two sides of the tab portion 210 is insufficient, the visual camera 10 cannot be placed horizontally. According to the embodiment of this application, a view filed direction of the visual camera 10 is changed by virtue of the prism 21, and the visual camera 10 can be placed vertically or obliquely on an outer side of the tab portion 210, thereby solving the problem that the visual camera 10 is inconvenient to arrange. Moreover, the first drive member 30 can drive the visual camera 10 to implement fly-shot imaging, so that the visual camera 10 can acquire a complete image of the side surface of the tab portion 210 during one-time image acquisition, further improving the detection efficiency and guaranteeing the detection effect.

Figure 4:
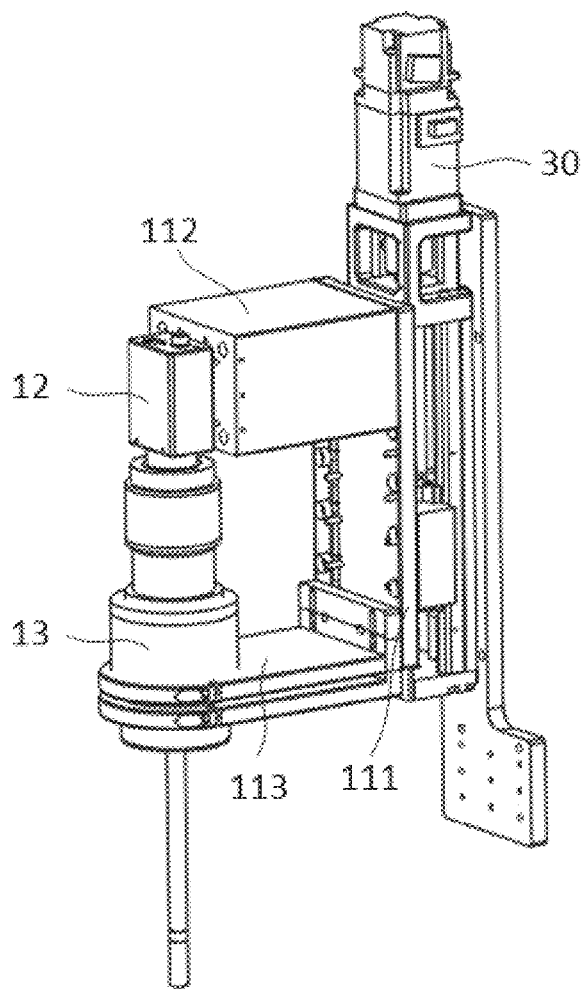
FIG. 4 is a three-dimensional schematic diagram of a visual camera and a first drive member in the tab detection mechanism shown in FIG. 3.

Referring to FIG. 3 and FIG. 4, in some embodiments, the visual camera 10 includes a first bracket 11 connected to the first drive member 30, as well as a camera 12 and a telecentric lens 13 that are disposed on the first bracket 11, where the telecentric lens 13 and the camera 12 are sequentially disposed above the prism 21 in the vertical direction.

The first bracket 11 is connected to the first drive member 30, such that the first drive member 30 can drive the camera 12 and the telecentric lens 13 to move in the vertical direction by virtue of the first bracket 11. The first bracket 11 may include a fixing plate 111 disposed vertically, and a camera stand 112 and a lens holder 113 that are disposed on one side of the fixing plate 111, where the camera 12 is disposed on the fixing plate 111 through the camera stand 112, and the telecentric lens 13 is disposed on the fixing plate 111 through the lens holder 113. The first drive member 30 is connected to one side of the fixing plate 111 facing away from the camera stand 112 and the lens holder 113.

The camera 12 images the side surface of the tab portion 210 by reflection of the telecentric lens 13 and the prism 21. The telecentric lens 13 (Telecentric) is designed mainly for correcting parallax of conventional industrial lenses. The telecentric lens enables an acquired image to be unchanged in magnifying power within a specified object distance range. This is a quite important application for a case in which measured objects are not on a same object surface. The telecentric lens 13 has unique optical characteristics such as high resolution, ultra-wide depth of field, ultra-low distortion and unique parallel light design, and therefore can meet the requirements of machine vision precision detection.

With use of the foregoing technical solution, the prism 21 can change a view field direction of the visual camera 10. Therefore, the camera 12 and the telecentric lens 13 can both be placed vertically, solving the problem that the camera 12 is inconvenient to place due to a too small space on sides of the tab portion 210. The first drive member 30 can drive the camera 12 and the telecentric lens 13 to move in the vertical direction simultaneously, thereby realizing fly-shot imaging of the camera 12.

Referring to FIG. 1 and FIG. 3, in some embodiments, an included angle between the prism 21 and the vertical direction is 45°.

With use of the prism 21 in 45° from the vertical direction, the view field direction of the camera 12 can be changed, the prism 21 can reflect light on the side surface of the tab portion 210, and the camera 12 acquires an image of the side surface of the tab portion 210 by shooting a surface of the prism 21. In addition, the 45° prism 21 can reflect light and make incident light be deviated 90°, so that the vertically placed visual camera 10 shoots the tab portion 210 that is placed horizontally.

It can be understood that in other embodiments, the angle of the prism 21 is not limited to 45°, provided that the prism 21 can project the image of the side surface of the tab portion 210 to the visual camera 10. For example, the angle of the prism 21 is 30° to 60°.

Referring to FIG. 3 to FIG. 8, in some embodiments, a mounting height of the telecentric lens 13 from the prism 21 is greater than or equal to a difference between a working distance D of the telecentric lens 13 and a horizontal distance L2 from an upper edge of the prism 21 to the tab portion 210.

A to-be-tested electrode core 200 is placed flat on the electrode core positioning table 310, that is, a surface, defined by width and length, of the electrode core 200 is placed flat on the electrode core positioning table 310, and two tab portions 210 are disposed on one side of the electrode core 200.

The working distance D of the telecentric lens 13 satisfies a condition: D=L1+L2.

The working distance D of the telecentric lens 13 is related to type selection of the telecentric lens 13, and is an intrinsic parameter of the telecentric lens 13; L1 represents a distance from an uppermost light reflection point on the prism 21 to the telecentric lens 13; and L2 represents a horizontal distance from the upper edge of the prism 21 to the tab portion 210, that is, a distance from the upper edge of the prism 21 to an outermost edge of the tab portion 210 in a horizontal direction, where the upper edge of the prism 21 refers to an upper edge of a surface of the prism 21 in the vertical direction.

In particular, the uppermost reflection point on the prism 21 refers to a highest point, capable of reflecting light, on the prism 21 in the vertical direction. There may be tabs staggered on the side surface of the tab portion 210, so the outermost edge of the tab portion 210 refers to an outermost edge of a longest tab.

Based on the above condition of the working distance D, it can be obtained that L1=D-L2.

Further, the mounting height of the telecentric lens 13 from the prism 21 is greater than or equal to L1, that is, the mounting height of the telecentric lens 13 from the prism 21 is greater than or equal to the difference between the working distance D of the telecentric lens 13 and the horizontal distance L2 from the upper edge of the prism 21 to the tab portion 210. The mounting height of the telecentric lens 13 from the prism 21 refers to a height of a lower edge of the telecentric lens 13 with respect to the prism 21. The lower edge of the telecentric lens 13 refers to the extreme edge of one side of the telecentric lens 13 toward the prism 21.

Optionally, the mounting height of the telecentric lens 13 from the prism 21 is greater than L1. that is, the mounting height of the telecentric lens 13 from the prism 21 is greater than the difference between the working distance D of the telecentric lens 13 and the horizontal distance L2 from the upper edge of the prism 21 to the tab portion 210, thereby guaranteeing a certain shooting allowance.

After the electrode core 200 is wound, the plurality of layers of tabs are in different states. The tabs in the respective layers are different in evenness and wrinkled, gaps are formed between the tab layers, and different thicknesses of different tabs of the electrode core 200 result in different shooting ranges of the camera. Please also refer to FIG. 1 to show the situation about unevenness of the plurality of layers of tabs; please refer to FIG. 2 to show the situation about staggering of the plurality of layers of tabs.

With the above condition satisfied, the prism 21 can be installed on one side of the tab portion 210 and toward the side surface of the tab portion 210, and the mounting height of the telecentric lens 13 depends on the working distance of the telecentric lens 13 and the horizontal distance from the upper edge of the prism 21 to the tab portion 210. In this way, it can be ensured that the side surface of the tab portion 210 is within the working distance of the telecentric lens 13, and thus the visual camera 10 can shoot a complete and clear image of the side surface of the tab portion 210. The tab detection mechanism 100 can detect a single layer of tabs or a plurality of layers of tabs and can detect situations such as unevenness of the plurality of layers of tabs and staggering of the tabs.

In some embodiments, the tab portion 210 includes a plurality of tabs stacked in a first direction. A moving distance X of the visual camera 10 in the vertical direction is greater than a maximum offset distance H of the plurality of tabs in a second direction, where the second direction is perpendicular to the first direction, satisfying the following condition: X>H.

Specifically, the first direction is a thickness direction T of the electrode core 200, and the second direction is a length direction L of the electrode core 200. The plurality of tabs are stacked in the first direction and are likely to be staggered in the second direction. Therefore, during detection, it is necessary to detect an offset distance of the plurality of tabs.

The moving distance X of the visual camera 10 in the vertical direction is a moving distance of the visual camera 10 driven by the first drive member 30. The maximum offset distance of the plurality of tabs in the second direction refers to an offset length of a longest tab and a shortest tab when viewed from one side of the tab portion 210. Optionally, the moving distance X is 20 mm to 30 mm, but is not limited thereto, which is specifically determined based on the tab portion 210.

With the above condition satisfied, the visual camera 10 moves a certain distance in the vertical direction, so that it can be ensured that the visual camera 10 can shoot side surfaces of the plurality of tabs and shoot staggered positions of the tabs, thereby improving the detection accuracy.

It can be understood that in order to ensure a certain allowance, the moving distance of the visual camera 10 is greater than or equal to the sum of the maximum offset distance H of the plurality of tabs and the allowance. The allowance may include allowance a and allowance b, where allowance a is an allowance of a distance from the upper edge of the prism 21 to the longest tab, and allowance b is an allowance of a distance from the upper edge of the prism 21 to the shortest tab.

Therefore, the moving distance of the visual camera 10 satisfies the following condition: X≥a+H+b, thereby ensuring that the visual camera 10 can shoot the side surfaces of the plurality of tabs under a certain allowance requirement.

In some embodiments, a maximum height difference H2 between the upper edge of the prism 21 and the lower edge of the prism 21 is greater than a view field B of the visual camera 10, and the view field B1 of the visual camera 10 is greater than a total thickness h1 of the tab portion 210, satisfying H2>B1>h1.

The maximum height difference H2 between the upper edge of the prism 21 and the lower edge of the prism 21 refers to the maximum height difference between the upper edge and the lower edge of the prism 21 in the vertical direction. It can be understood that the height of an uppermost light reflection point on the prism 21 may be located on the upper edge of the prism 21 or lower than the upper edge of the prism 21; the view field B1 of the visual camera 10 is an inherent parameter of the visual camera 10 and is related to type selection of the visual camera 10; the total thickness of the tab portion 210 refers to a distance from a highest point of a top tab bulge to a lowest point of a bottom tab recess; and the thickness direction of the tab portion 210 is also the thickness direction of the electrode core 200, that is, the above first direction.

With the above condition satisfied, the prism 21 can be ensured to reflect the overall side surface of the tab portion 210 and the visual camera 10 can be ensured to shoot the overall side surface of the tab portion 210.

Figure 5:
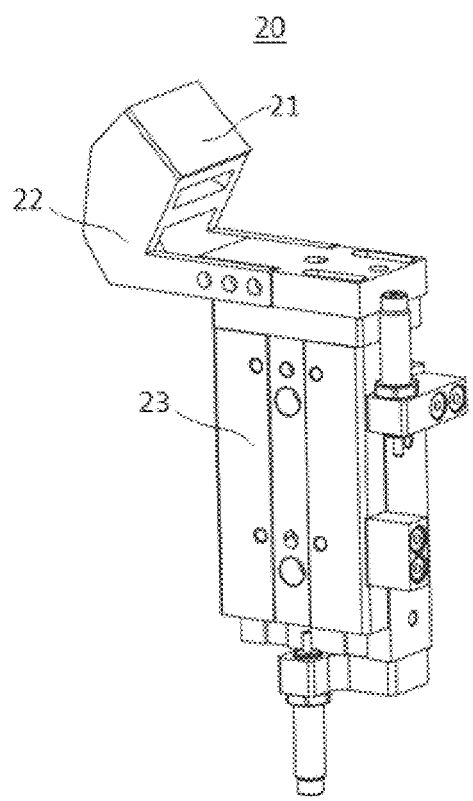
FIG. 5 is a three-dimensional schematic diagram of a prism assembly in the tab detection mechanism shown in FIG. 3.
Figure 6:
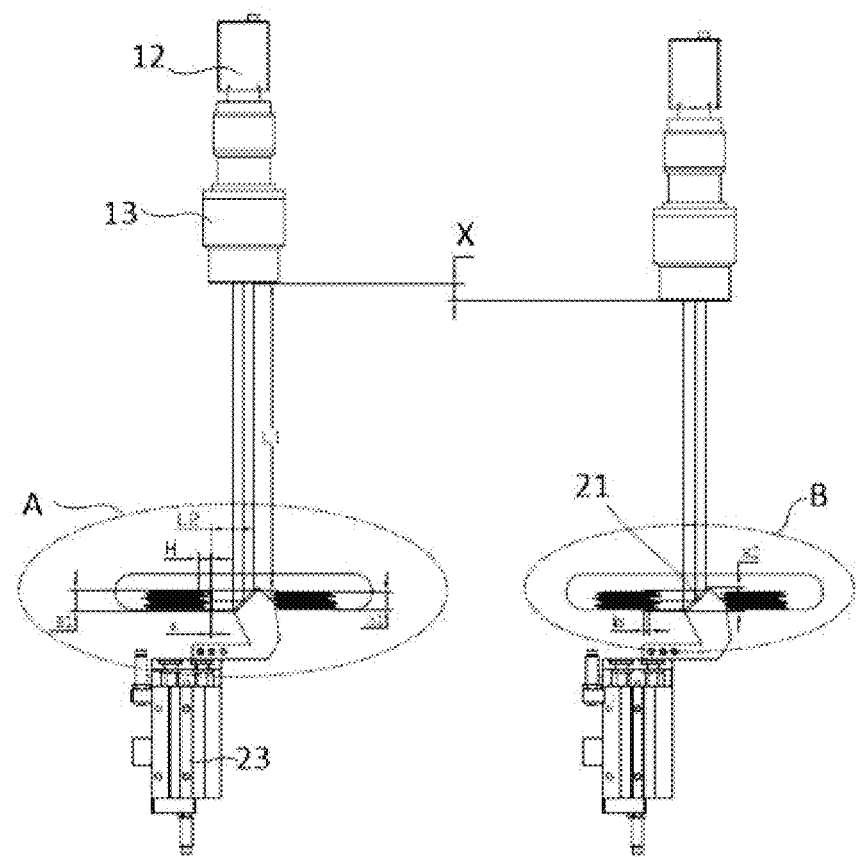
FIG. 6 is a schematic diagram showing a principle of the tab detection mechanism shown in FIG. 3.
Figure 7:
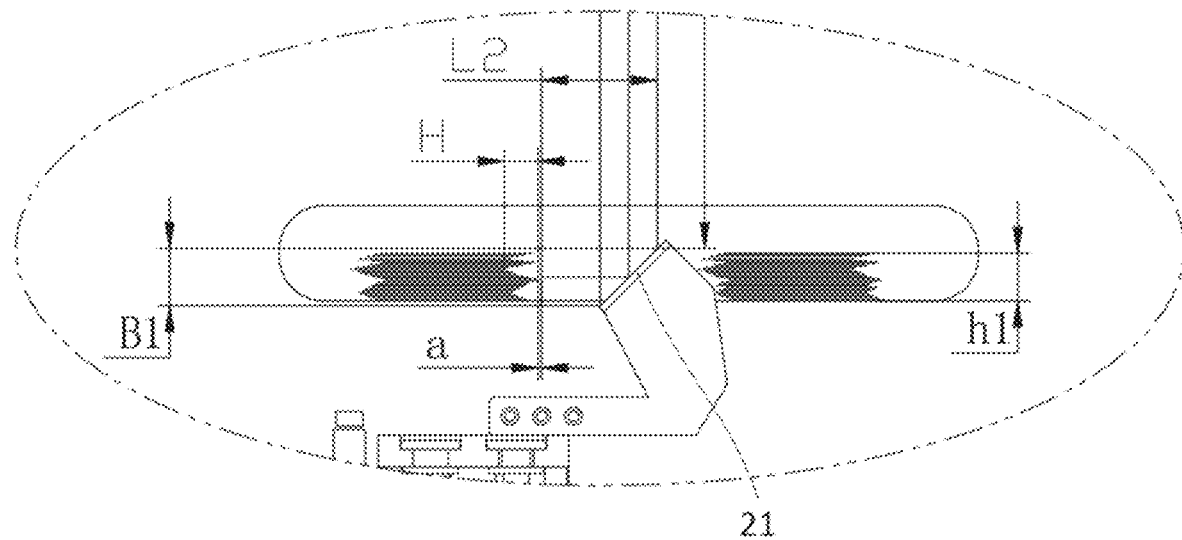
FIG. 7 is a locally enlarged view of part A in the tab detection mechanism shown in FIG. 6.

Referring to FIG. 3 and FIG. 5. in some embodiments, the tab detection mechanism 100 further includes a second drive member 23, where the second drive member 23 is connected to the prism 21 and configured to drive the prism 21 to move in a direction close to or away from the electrode core 200.

Specifically, the electrode core 200 is disposed on the electrode core positioning table 310, and the electrode core 200 is conveyed by the conveying mechanism 300. The second drive member 23 can drive the prism 21 to move in a direction away from the electrode core 200, such that the prism 21 is kept away from the electrode core 200 that is being conveyed. When the electrode core 200 is conveyed to the tab detection mechanism 100, the second drive member 23 drives the prism 21 to move in a direction close to the electrode core 200, such that the prism 21 is toward the side surface of the tab portion 210, and then the visual camera 10 is used to acquire an image of the side surface of the tab portion 210.

With the second drive member 23 provided, the prism 21 is enabled to move in a direction close to or away from the electrode core 200, such that the prism 21 is kept away from the electrode core 200 that is being conveyed.

In some embodiments, the second drive member 23 is a cylinder, where the second drive member 23 is configured to drive the prism 21 to move in the vertical direction.

The prism 21 moves in only the vertical direction and can be placed at a side portion of the tab portion 210 after moving to a proper position, thereby ensuring that the prism 21 can reflect light on the side surface of the tab portion 210.

It can be understood that in other embodiments, the second drive member 23 may also be another servo drive member. Alternatively, the second drive member 23 may drive the prism 21 to move in the horizontal direction, such that the prism 21 is kept away from the electrode core 200 that is being conveyed.

Optionally, the tab detection mechanism 100 includes a prism assembly 20, where the prism assembly 20 includes a prism 21, a second bracket 22 and a second drive member 23. The prism 21 is disposed on the second bracket 22, and the second bracket 22 is connected to a drive end of the second drive member 23, so that the second drive member 23 can drive the second bracket 22 and the prism 21 to move in the vertical direction.

In one embodiment, the tab detection mechanism 100 includes a visual camera 10, a prism assembly 20 and a first drive member 30. w sere the visual camera 10 is connected to both a horizontal servo module (not shown in the figure) and the first drive member 30. A detection process of the tab detection mechanism 100 is as follows: an initial position of the prism 21 is below the conveying mechanism 300; when the electrode core 200 reaches the tab detection mechanism 100, the second drive member 23 drives the prism 21 to move up until the tab portion 210 is exactly within the view field of the camera, the visual camera 10 is first driven by the horizontal servo module to position the tab, the first drive member 30 drives the visual camera 10 to move downward, and the visual camera 10 implements multiple times of imaging according to a frequency of 1 mm per time. After imaging is completed, the visual camera 10 and the prism 21 are sequentially returned to the initial position, and the electrode core 200 moves to the next procedure. It can be understood that the horizontal servo module may also be omitted, and in this case, the visual camera 10 is driven by only the first drive member 30 to move in the vertical direction.

Figure 9:
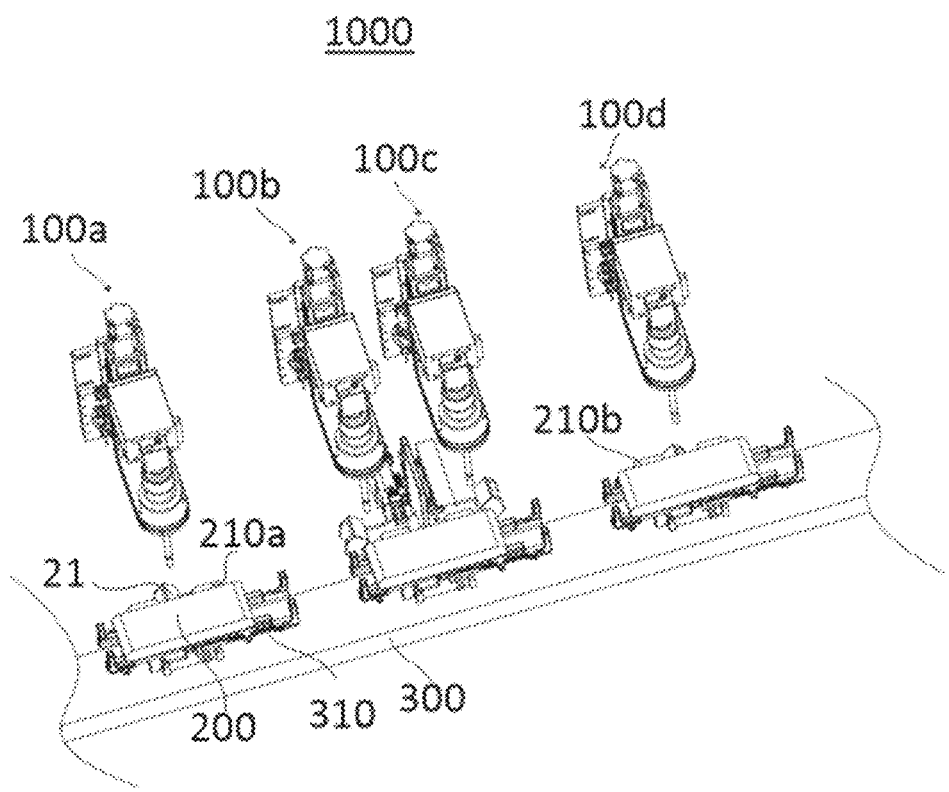
FIG. 9 is a three-dimensional schematic diagram of a tab detection device according to an embodiment of this application.

Referring to FIG. 3 and FIG. 9, an embodiment of a second aspect of this application discloses a tab detection device 1000 configured to detect a first tab portion 210a and a second tab portion 210b on an electrode core 200. The tab detection device 1000 includes a first tab detection mechanism 100a, a second tab detection mechanism 100b, a third tab detection mechanism 100c and a fourth tab detection mechanism 100d. At least one of the first tab detection mechanism 100a, the second tab detection mechanism 100b, the third tab detection mechanism 100c and the fourth tab detection mechanism 100d is the tab detection mechanism 100 according to the first aspect.

The first tab detection mechanism 100a is configured to detect an inner side surface of the first tab portion 210a; the second tab detection mechanism 100b is configured to detect an outer side surface of the second tab portion 210b; the third tab detection mechanism 100c is configured to detect an outer side surface of the first tab portion 210a; and the fourth tab detection mechanism 100d is configured to detect an inner side surface of the second tab portion 210b.

The first tab detection mechanism 100a, the second tab detection mechanism bob, the third tab detection mechanism 100c and the fourth tab detection mechanism 100d can be arranged in sequence so as to detect the tab portions on the electrode core 200. The first tab detection mechanism 100a, the second tab detection mechanism 100b, the third tab detection mechanism 100c and the fourth tab detection mechanism 100d can be arranged in a straight line or in a ring shape, which is not limited in this application. It can be understood that the first tab detection mechanism 100a, the second tab detection mechanism 100b, the third tab detection mechanism 100c and the fourth tab detection mechanism 100d may not be arranged in sequence, provided that the first tab portion 210a and the second tab portion 210b can be detected in sequence.

The tab detection device 1000 includes the first tab detection mechanism 100a, the second tab detection mechanism 100b, the third tab detection mechanism 100c and the fourth tab detection mechanism 100d that are capable of detecting the inner side surface of the first tab portion 210a, the outer side surface of the first tab portion 210a, the inner side surface of the second tab portion 210b and the outer side surface of the second tab portion 210b, respectively. The tab detection device 1000 can implement automatic and comprehensive detection of tab portions without manual operation, thereby improving the detection efficiency and accuracy and improving the quality of batteries.

Figure 8:
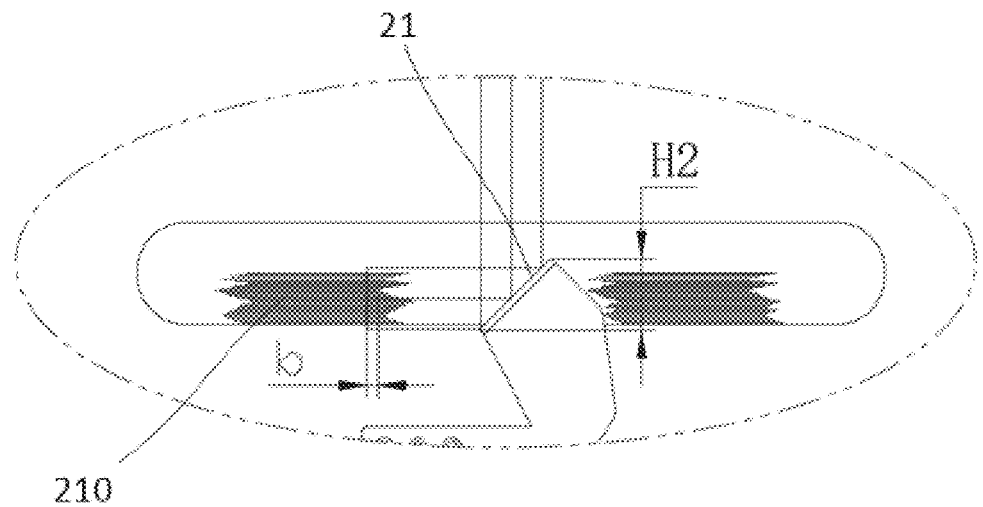
FIG. 8 is a locally enlarged view of part B in the tab detection mechanism shown in FIG. 6.
Figure 10:
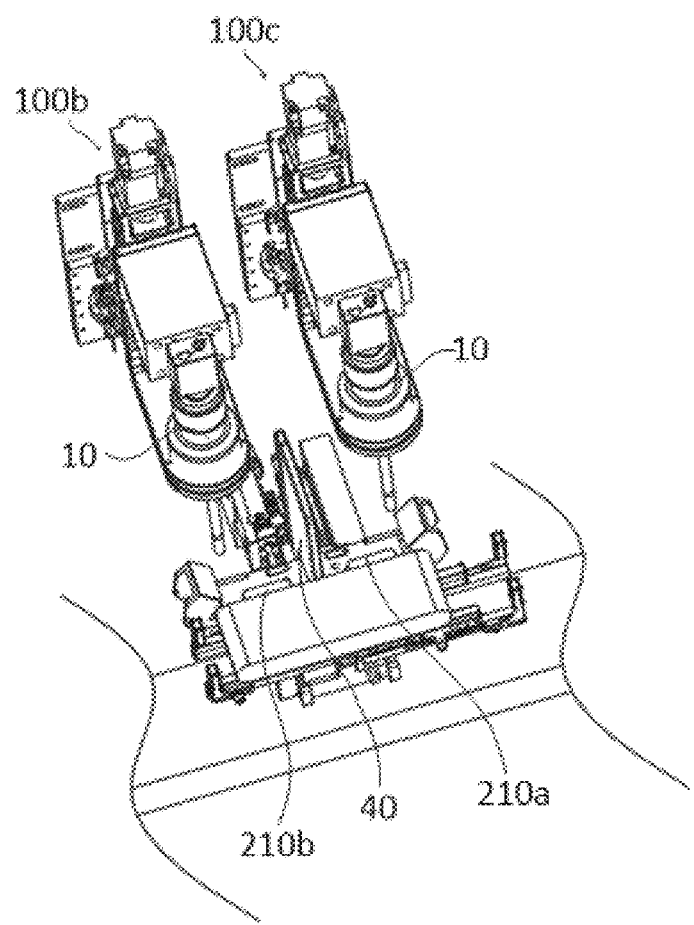
FIG. 10 is a three-dimensional schematic diagram of a second tab detection mechanism, a third tab detection mechanism, a light shield plate and an electrode core in the tab detection device shown in FIG. 9.
Figure 11:
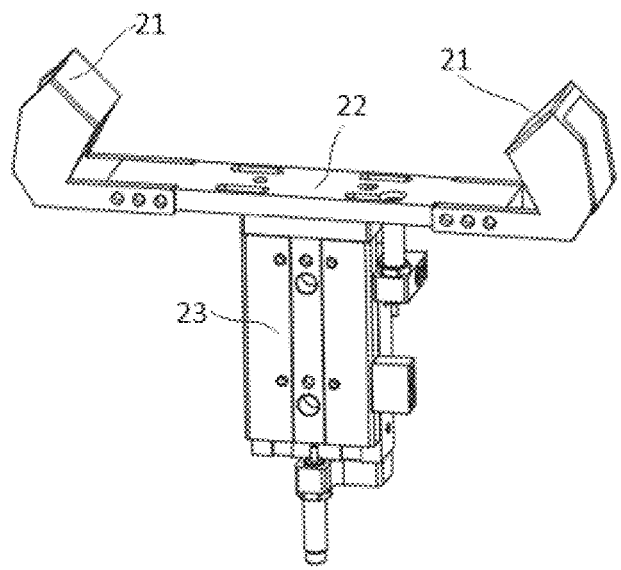
FIG. 11 is a three-dimensional schematic diagram of two prims, a second] bracket and a second drive member in the tab detection device shown in FIG. 9.

Referring to FIG. 8 to FIG. 10, in some embodiments, a prism 21 in the second tab detection mechanism 100b and a prism 21 in the third tab detection mechanism 100c are located on a same second bracket 22 and are arranged opposite to each other. A prism 21 in the first tab detection mechanism 100a and a prism 21 in the fourth tab detection mechanism 100d are arranged in a mirror-image form.

The second tab detection mechanism 100b and the third tab detection mechanism 100c are respectively used for detecting the outer side surfaces of the second tab portion 210b and the first tab portion 210a, the two prisms 21 are separately arranged on two opposite sides of the electrode core 200 and toward the outer side surfaces of the second tab 210b and the first tab portion 210a. Therefore, the two prisms 21 can be arranged opposite to each other on the same second bracket 22.

The prism 21 in the first tab detection mechanism 100a and the prism 21 in the fourth tab detection mechanism loud are arranged in a mirror-image form, so as to detect the outer side surfaces of the first tab portion 210a and the second tab portion 210b, respectively.

Further, the second drive member 23 can drive the prism 21 to move in the vertical direction. Therefore, the prism 21 in the second tab detection mechanism 100b and the prism 21 in the third tab detection mechanism 100c can share the second bracket 22 and the second drive member 23, that is, the second drive member 23 is connected to the second bracket 22 to drive the two prims 21 to move synchronously, simplifying the drive structure and lowering the device cost. In addition, the second tab detection mechanism 100b and the third tab detection mechanism 100c can implement synchronous detection, further improving the detection efficiency.

Figure 12:
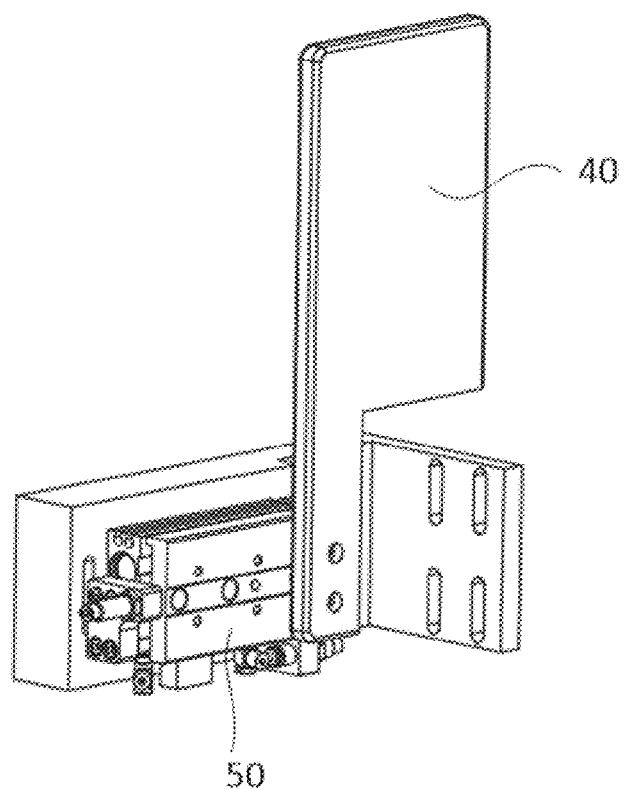
FIG. 12 is a three-dimensional schematic diagram of a light shield assembly in the tab detection device shown in FIG. 9.

Referring to FIG. 9, FIG. 10 and FIG. 12, in some embodiments, the tab detection device 1000 further includes a light shield plate 40 and a third drive member 50, where the third drive member 50 is configured to drive the light shield plate 40 to move so that the light shield plate 40 is located between the prism 21 in the second tab detection mechanism 100b and the prism 21 in the third tab detection mechanism 100c, and the light shield plate 40 is a non-transparent plate. The third drive member 50 may be, but is not limited to, a cylinder, and may also be a ball screw or another drive member.

The light shield plate 40 can shield light, so as to prevent the prism 21 from reflecting light to a visual camera 10 of an adjacent detection mechanism. The light shield plate 40 may be disposed in the vertical direction, and the light shield plate 40 can extend from a position above the electrode core 200 to a lower end of the telecentric lens 13.

The second tab detection mechanism 100b and the third tab detection mechanism 100c can implement synchronous detection. Therefore, in order to avoid mutual interference of the two detection mechanisms, a movable light shield plate 40 is provided in the embodiment of this application. During detection, the third drive member 50 enables the light shield plate 40 to be located between the second tab detection mechanism 100b and the third tab detection mechanism 100c, so that mutual interference is avoided, and the imaging quality will not be affected. After detection, the third drive member 50 enables the light shield plate 40 to be moved out from the position between the second tab detection mechanism 100b and the third tab detection mechanism 100c, so as not to hinder the conveying of the electrode core 200.

With the third drive member 50 and the light shield plate 40 provided, mutual interference between the second tab detection mechanism 100b and the third tab detection mechanism 100c can be avoided, and thus the imaging quality is guaranteed.

In some embodiments, the light shield plate 40 is a non-transparent plate subjected to matte black processing. The light shield plate 40 is subjected to matte black processing, therefore the light shield plate 40 can not only shield light but also avoid light reflection, thereby preventing reflected light from affecting an imaging effect of the visual camera 10.

In some embodiments, the tab detection device 1000 further includes a conveying mechanism 300, where the conveying mechanism 300 is configured to convey the electrode core 200, so that the electrode core 200 sequentially passes through the first tab detection mechanism 100a, the second tab detection mechanism 100b, the third tab detection mechanism 100c and the fourth tab detection mechanism load.

The conveying mechanism 300 may be a conveying belt, a conveying chain, a turnplate, and the like. The type of the conveying mechanism 300 is not limited in this application. The electrode core 200 is disposed on the conveying mechanism 300 through an electrode core positioning table 310, so that the conveying mechanism 300 can drive the electrode core positioning table 310 and the electrode core 200 to move, thus the electrode core 200 sequentially passes through the four tab detection mechanisms. In this way, the inner and outer side surfaces of the first tab portion 210a and the second tab portion 210b are detected, and wrinkling, folding, cracking and the like of the tabs, as well as staggering situation and evenness of a plurality of tab layers are detected.

The tab detection device 1000 further includes light sources (not shown in the figure). Optionally, the first tab detection mechanism 100a, the second tab detection mechanism 100b, the third tab detection mechanism 100c and the fourth tab detection mechanism 100d each fit with one light source for use.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the foregoing embodiments or make equivalent replacements to some or all technical features thereof; these modifications or replacements do not separate the essence of the corresponding technical solutions from the scope of the technical solutions of the embodiments of this application, and they shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A tab detection mechanism, configured to detect a tab portion on an electrode core, comprising:
   a visual camera;
   a prism, disposed below the visual camera and configured to reflect light on a side surface of the tab portion to the visual camera; and
   a first driver, connected to the visual camera to drive the visual camera to move in a vertical direction, wherein the visual camera is capable of shooting a plurality of images while moving,
   wherein the tab detection mechanism further comprises a second driver, and the second driver is connected to the prism to drive the prism to move in a direction close to or away from the electrode core.

2. The tab detection mechanism according to claim 1, characterized in that the visual camera comprises a first bracket connected to the first driver, as well as a camera and a telecentric lens that are disposed on the first bracket, and the telecentric lens and the camera are sequentially disposed above the prism in the vertical direction.

3. The tab detection mechanism according to claim 2, characterized in that an included angle between the prism and the vertical direction is 45°.

4. The tab detection mechanism according to claim 3, characterized in that a mounting height of the telecentric lens from the prism is greater than or equal to a difference between a working distance of the telecentric lens and a horizontal distance from an upper edge of the prism to the tab portion.

5. The tab detection mechanism according to claim 3, characterized in that the tab portion comprises a plurality of tabs stacked in a first direction, a moving distance of the visual camera in the vertical direction is greater than a maximum offset distance of the plurality of tabs in a second direction, and the second direction is perpendicular to the first direction.

6. The tab detection mechanism according to claim 3, characterized in that a maximum height difference between the upper edge of the prism and a lower edge of the prism is greater than a view field of the visual camera, and the view field of the visual camera is greater than a total thickness of the tab portion.

7. The tab detection mechanism according to claim 1, characterized in that the second driver is a cylinder, and the second driver is configured to drive the prism to move in the vertical direction.

8. A tab detection device, configured to detect a first tab portion and a second tab portion on an electrode core, comprising:
   a first tab detector to detect an inner side surface of the first tab portion;
   a second tab detector to detect an outer side surface of the second tab portion;
   a third tab detector to detect an outer side surface of the first tab portion; and
   a fourth tab detector to detect an inner side surface of the second tab portion, wherein
   at least one of the first tab detector, the second tab detector, the third tab detector and the fourth tab detector is the tab detection mechanism according to claim 1.

9. The tab detection device according to claim 8, characterized in that a prism in the second tab detector and a prism in the third tab detector are located on a same second bracket and are arranged opposite to each other.

10. The tab detection device according to claim 8, characterized in that a prism in the first tab detector and a prism in the fourth tab detector are arranged in a mirror-image form.

11. The tab detection device according to claim 8, characterized in that the tab detection device further comprises a light shield plate and a third driver, the third driver is configured to drive the light shield plate to move, such that the light shield plate is located between the prism of the second tab detector and the prism of the third tab detector, and the light shield plate is a non-transparent plate.

12. The tab detection device according to claim 11, characterized in that the light shield plate is a non-transparent plate subjected to matte black processing.

13. The tab detection device according to claim 8, characterized in that the tab detection device further comprises a conveyer to convey the electrode core, so that the electrode core sequentially passes through the first tab detector, the second tab detector, the third tab detector and the fourth tab detector.

\* \* \* \* \*